Jan. 19, 1926.  
S. W. BRIGGS  
TRACTOR SCOOP  
Filed April 27, 1925  
1,569,944  
4 Sheets-Sheet 1
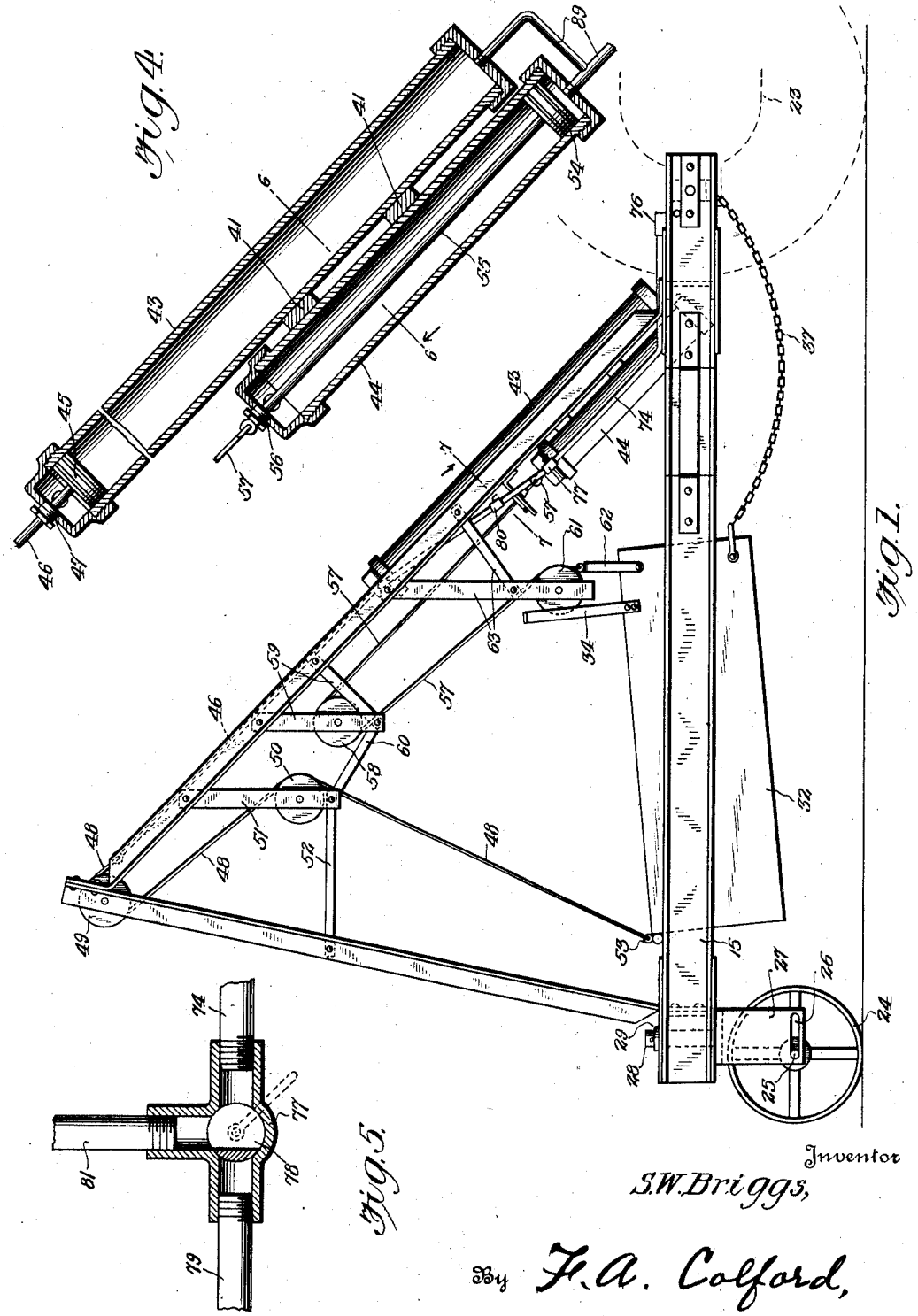
Inventor  
S.W.Briggs,  
By F. A. Colford,  
Attorney

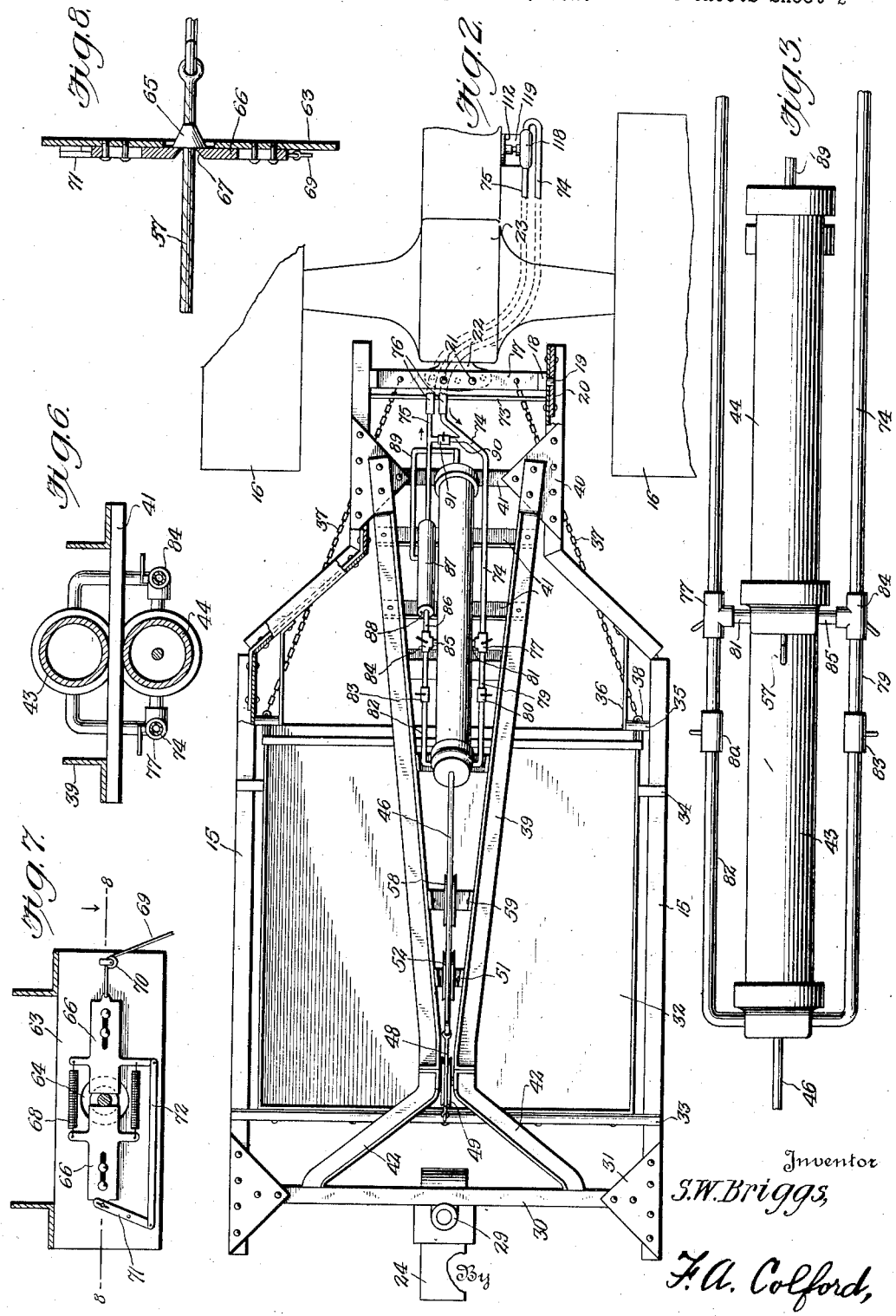

Jan. 19, 1926.

S. W. BRIGGS 1,569,944

TRACTOR SCOOP

Filed April 27, 1925  4 Sheets-Sheet 3

Inventor
S. W. Briggs,
By F. A. Colford,
Attorney

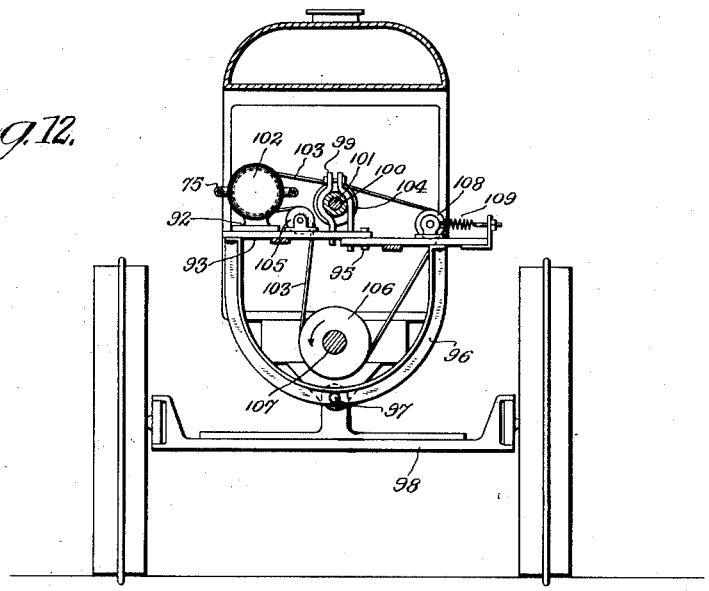
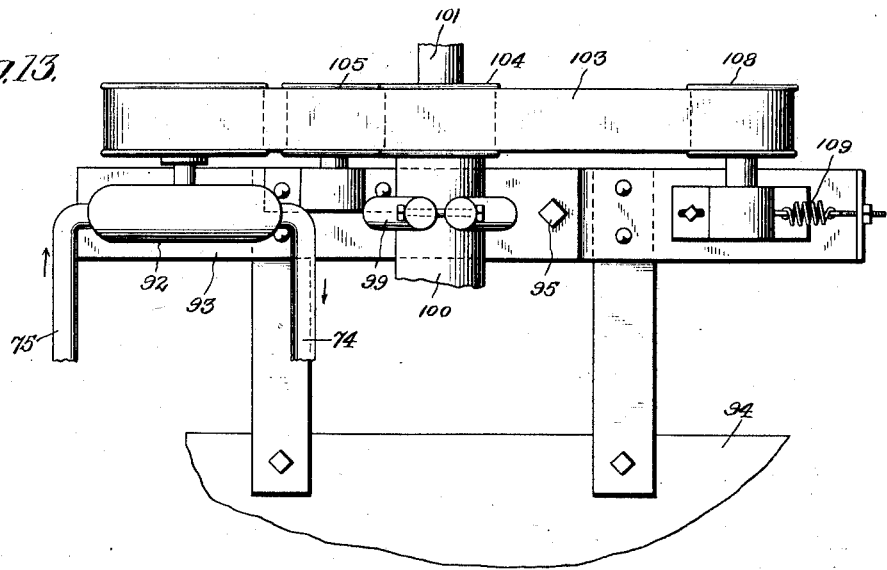
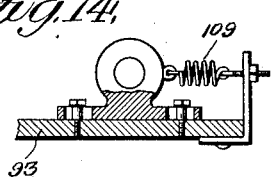

Patented Jan. 19, 1926.

1,569,944

UNITED STATES PATENT OFFICE.

SOUTHWICK W. BRIGGS, OF GLENMONT, MARYLAND.

TRACTOR SCOOP.

Application filed April 27, 1925. Serial No. 26,247.

*To all whom it may concern:*

Be it known that SOUTHWICK W. BRIGGS, a citizen of the United States, residing at Glenmont, in the county of Montgomery and State of Maryland, has invented certain new and useful Improvements in Tractor Scoops, of which the following is a specification.

The present invention relates to scoops for removing dirt and the like in excavation work, in grading and any other operation requiring the removal of granular or powdered substances in large quantities and by use of a tractor or the like.

It is an object of this invention to provide a scoop of this character which may be so mounted upon a tractor that it may be considered as a part thereof, and may be guided and propelled by the normal operation of the tractor.

Another object of the invention is to provide a scoop structure of this character wherein may be utilized the advantages of hydraulic cylinders and the like for controlling the operation of the pan or scoop and wherein the motor of the tractor may be utilized as the prime mover in the hydraulic circuit and eliminate the necessity of providing a separate pump or engine for manipulation of the scoop.

Another object of the invention is to provide an improved connection between the scoop and the tractor and an improved support for the scoop which admits of the swinging of the scoop as a part of the frame of the tractor and which at the same time accommodates the scoop to unevenness in the ground surface over which the tractor and scoop may be operated, and which affords a staunch support for the scoop without undue strain upon the tractor.

A further object of the invention is to provide a scoop frame of peculiar construction which is suitably reinforced to carry the pan and its appurtenances, and which is provided with a stationary derrick structure for supporting the hydraulic cylinders and the like, and a suitable means for supporting the pan when loaded in a carrying position to relieve the cylinders of the strain or possible release incident to leakage.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevation of a scoop attachment for tractors constructed according to the present invention, the dotted lines indicating the rear end of a tractor.

Figure 2 is a top plan view of the same.

Figure 3 is a detail enlarged bottom side view of the hydraulic cylinders and the pipes associated therewith.

Figure 4 is a vertical longitudinal section through the same.

Figure 5 is a detail enlarged sectional view through one of the three-way controlling valves.

Figure 6 is a transverse section taken through the cylinders and adjacent parts, substantially on the line 6—6 of Figure 4.

Figure 7 is a transverse section through the frame substantially on the line 7—7 of Figure 1, the cylinders being removed and showing the automatic latch device for relieving the lower cylinder of the load.

Figure 8 is a section through the same taken substantially on the line 8—8 of Figure 7.

Figure 12 is a transverse section taken through the forward end of a tractor, showing a modified form of fluid pump mounting and connecting means for the pump.

Figure 13 is an enlarged fragmentary top plan view of the same, the water tank being removed and a portion of the cylinder block being shown, and Figure 14 is an enlarged detail section of the shiftable bearing for the belt tightener of the modified form.

Figure 9:
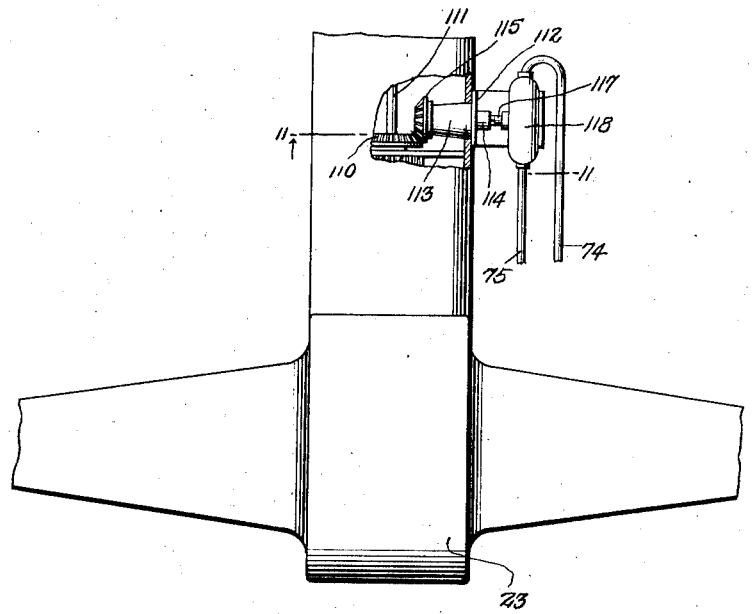
Figure 9 is a fragmentary sectional top plan view of a tractor of the Fordson type, showing one means for mounting and connecting a fluid circulating pump thereon.

Referring to the drawings the scoop comprises a frame 15 which is preferably made of channel iron having the channels facing outwardly and which comprises a pair of main side beams extending substantially the full length of the scoop and which are converged at their forward ends substantially to fit between the rear or drive wheels 16 of a tractor of any suitable type. The forward end of the frame 15 is provided with a cross bar 17 which is up-turned at opposite ends, as at 18 and provided thereat with outwardly extending trunnions or studs 19 which have pivotal bearing into the adjacent sides of the frame 15 and the frame may be reinforced at such points by bearing plates 20. The bar 17 is adapted to rock on the studs 19 and is provided intermediately with a pair of bolts 21 or the like adapted to engage in spaced apart relation in selected openings of a clevis or draw bar 22 which projects from the rear end of the tractor 23.

The rear end of the frame 15 is supported upon a castor wheel 24 which is mounted on a shaft 25 engaging at opposite ends in horizontal slots 26 formed in the lower ends of a forked bracket 27, the latter carrying an upwardly extending shaft 28 which is mounted in a bearing 29 secured intermediately upon a cross member 30 carried in the frame 15. The cross member 30 may also be of channel construction with its flanges projecting outwardly and attached to the side bars of the frame 15 by upper and lower pairs of 45 degree coupling plates 31 which are riveted or otherwise suitably secured to the adjacent parts.

Mounted within the frame 15 is a pan or scoop member 32 having rear and side walls, and which is open at its forward end adapted to take up earth and the like as the scoop is drawn forwardly. The pan 32 is provided across its rear end and at its upper edge with a pivot bar 33 projecting at opposite ends beyond the sides of the pan 32 and engaging across the upper sides or edges of the side bars of the frame 15. The pan 32 is adapted to rock and slide upon its pivot bar 33 and is supported by the same at its rear end in the frame. The pan 32 is provided near its forward end and at opposite sides with stops 34 which comprise the out turned ends of upstanding arms secured to the sides of the pan and which rise to a considerable distance above the pan so as to engage the side bars of the frame 15 only when the forward end of the pan is lowered into its lowermost position. These stops 34 therefore are adapted to transmit strain imposed upon the forward end of the pan to the frame 15 when the pan is being filled and taking up a relative heavy load. The pan 32 is held from shifting forwardly in the frame 15 beyond a desired extent by stop rollers 35 which are mounted in brackets 36 secured to the inner sides of the frame 15 and which project inwardly from the frame 15 to engage the forward edges of the side walls of the pan when the latter is shifted forwardly. The rollers 35 offer but slight resistance to the raising and lowering of the pan and cause the sliding of the pivot bar 32 along the side bars of the frame when the forward end of the pan is raised and lowered.

In order to prevent the longitudinal shifting of the pan 32 rearwardly, beyond a predetermined distance, a pair of chains 37 are employed, the forward ends of the chains being secured to the cross bar 17 at the front of the frame while the rear ends of the chains 37 are connected to the forward end of the pan at opposite sides thereof by links 38 or the like which are pivoted to the side walls of the pan in the present instance.

The chains 37 are drawn taut when the pan is lowered and the strain of the pull of the pan is transmitted directly through the chains 37 to the cross bar 17 and the tractor 23 to the practical exclusion of the frame 15. The frame is thus relieved of considerable strain and tension incident to the operation of the scoop.

The frame 15 carries a derrick of suitable construction which overhangs the frame, and which in the present instance comprises a forward part made up of a pair of angle irons 39 which are flattened at their lower ends and bent to lie upon coupling plates 40 which are secured to the opposite sides of the frame in rear of the cross piece 17. The side pieces 39 are reinforced at suitable spaced points by cross braces 41 in any desired number and spaced according to the strength desired and the location and arrangement of the parts which are supported upon the derrick. The side pieces 39 of the forward portion of the derrick are flattened and drawn upwardly at their upper ends and secured to the upper end portions of uprights 42 which rise from the rear end of the frame, and which preferably are secured in spaced apart relation upon the rear cross piece 30. The uprights 42 are converged upwardly so as to meet the rearwardly converging side pieces 39 of the derrick and thus provide a strong and substantial structure capable of resisting lateral thrust of strain.

Arranged within the forward portion of the derrick, and upon the cross braces 41, is a pair of cylinders 43 and 44. The cylinder 43 may be secured across the upper faces of the cross braces 41 and the cylinder 44 is secured across the lower faces of the cross braces 41. The lower cylinder 44 is considerably shorter in length as compared with an upper cylinder 43. The upper cylinder has a piston 45 therein connected to the rod 46 which extends upwardly between the side members 39 and through a suitable stuffing box 47 in the head of the cylinder 43. The upper end of the piston rod 46 is connected to the cable 48 which is trained over a pulley 49 secured between the upper connected ends of the side pieces 39 of the frame and the uprights 42. The cable 48 is carried downwardly beneath the derrick frame to a second pulley 50 which is mounted in a suitable bracket 51 depending from the side members 39 of the derrick and held by a brace 52 extending forwardly from the uprights 42. The cable 48 after passing over the pulley 50 is carried downwardly and rearwardly to the pan 32 and is connected thereto at 53. When the piston 45 is moved downwardly in the cylinder 43 the rear end of the pan 32 is elevated so as to dump the contents of the pan.

The lower cylinder 45 has a piston 54 therein carrying a rod 55 which passes upwardly through a stuffing box 56 in the head of the cylinder 44 and is connected to a second cable 57. The cable 57 extends upwardly beneath the derrick frame and over a pulley 58 which is mounted in a bracket 59 depending from the derrick frame and secured by a brace 60 which extends from the lower end of the bracket 51. The cable 57 passes from the pulley 58 to a lower pulley 61 and is then connected to a bail 62 pivoted upon the forward end of the pan 32. The pulley 61 is mounted in a relatively long bracket 63 which is carried upon the derrick frame and in position to exert a substantially vertical pull of the cable 57 in elevating the forward end of the pan 32.

As the cylinders are adapted to be operated by hydraulic pressure, there is liability of leakage so that the cylinders cannot be entirely relied upon to hold the forward end of the pan in a position, with a load in the pan, for any great length of time. To therefore maintain the forward end of the pan 32 in raised position a suitable latch is employed, and the same may be of any desired construction which is releasable at the will of the operator to free the pan when it is desired to lower the forward end of it.

In the present illustration one form of latch is shown, and the same may comprise a plate 63 which is secured across the lower edge of the side members 39 of the derrick frame and in position closely adjacent to the upper end of the cylinder 44. The plate 63 has a relatively large opening 64 through its central portion and through which the cable 57 is adapted to freely pass. The cable 57 carries a shoulder 65 which is also adapted to freely pass through the opening 64 and which is flared or inclined away from the cylinder 44 but which has an abrupt outwardly facing annular shoulder. The plate 63 may be provided with a pair of sliding dogs 66 which are adapted to move toward and from each other on the plate 63 and which are located in diametrically opposed positions with respect to the opening 64. These dogs 66 are provided with beveled outer faces 67 adapted to slide against the inclined face of the shoulder 65, the latter spreading the dogs apart and permitting the shoulder to pass therebetween as the cable 57 is drawn downwardly with the piston 54. The dogs 66 are connected together by springs 68 or the like normally urging the dogs to spring together and against the flat side of the shoulder 65. The dogs thus hold the rope or cable 57 when its outer end has been drawn downwardly, and the dogs thus hold the forward end of the pan raised even though the pistons 54 may be released.

To manually release the latch a pull cord 69 is employed and the same may be carried through a pulley 70 and connected directly to one of the dogs 66. The other dog 66 is connected by a pin and slot connection with a lever 71 pivoted on the plate 63 and connected at its remote end by a link 72 to the first dog so that the dogs are forced outwardly and simultaneously when the pull cord 69 is operated. In this manner the bracket may be quickly released when it is desired to drop the same. The frame is provided, between the forward ends of the side bars 15, with a stop 73 in the form of a cross rod arranged slightly behind the pivoted cross bar 17 for limiting the swinging of the latter and thus preventing the tractor from tilting backwardly to a dangerous angle.

The fluid for operating the hydraulic cylinders 43 and 44 is conducted through a supply pipe 74 and a return pipe 75 which extend from the tractor 23 to the scoop, flexible hose connections 76 being interposed in the pipes 74 and 75 adjacent the pivoted bar 17 to prevent damage to the pipes upon relative movements of the tractor and scoop.

As shown by the arrow in Figure 2, the supply pipe 74 carries the fluid up into the derrick frame 39, and leads to a three-way valve 77 having a turning plug 78, as shown in Figure 5, which directs the fluid in a continuous flow through the extension pipe 79 to the upper end of the long cylinder 43. Passage of the fluid to the cylinder 43 is directly controlled by a valve 80 mounted in the extension pipe 79, and beyond the three-way valve 77. The three-way valve 77 is connected by a branch pipe 81 to the upper end of the short cylinder 44 so that the fluid may be carried to the short cylinder to the total or partial exclusion of the long cylinder 43. These pipes 74, 79 and 81 and their valves 77 and 80 are preferably located along one side of the cylinders 43 and 44, while the fluid return devices may be located on the opposite side of the cylinders as shown. Leading out of the upper end of the long cylinder 43 is an extension return pipe 82 having a valve 83 therein to control the exhausting of the fluid from the cylinder 43. The extension pipe 82 leads from the exhaust valve 83 to a second three-way valve 84 having a branch outlet pipe 85 opening into the upper end of the short cylinder 44. A pipe connection 86 is fitted between the three-way valve 85 and an expansion or compensating tank 87 of suitable size to receive the fluid exhausted from the cylinders 43 and 44 and to relieve the fluid of the pressure to which it may be subjected in the supply pipe 74, such as to a pressure of two hundred pounds. The tank 87 may have a suitable vent 88 in its top for the intake and exhaust of air incident to the rise and fall of the surface level of the fluid in the tank 87. The return pipe 75 is connected to the bottom of the tank 87, and the tank 87 is connected near its lower end to the bottoms of the cylinders 43 and 44 by a drain pipe 89 to freely admit the outlet of fluid which may accumulate by seepage beneath the pistons 45 and 54. A by-pass pipe 90, having a valve 91 therein, is connected across the supply and return pipes 74 and 75 in advance of the cylinders 43 and 44 so that the fluid may freely circulate when the tractor and scoop are conveyed long distances without operating the scoop.

Figure 10:
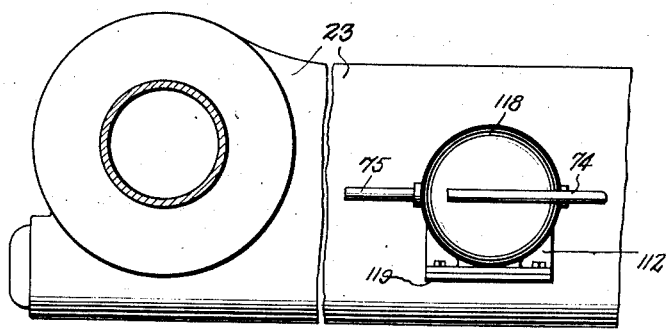
Figure 10 is a side elevation of the same.
Figure 11:
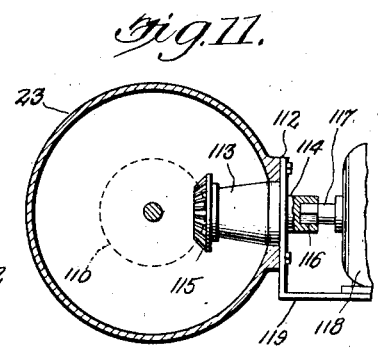
Figure 11 is a transverse section through the same taken substantially on the line 11—11 of Figure 9.

The fluid may be circulated in the pipes 74 and 75 in any suitable manner, such as by the motor of the tractor, and this latter may be carried out in any suitable manner. One means for circulating the fluid is shown in the accompanying drawings, Figures 9, 10 and 11, and comprises the following:—

The tractor 23 has the usual transmission bevel gear wheel 110 mounted on its longitudinal drive shaft 111 adjacent the usual side opening found in Fordson tractors for taking off auxiliary power. The usual cover plate is removed and the bracket 112 is secured over the opening as shown. The bracket plate 112 has an inwardly extending bearing sleeve 113 in which is mounted a shaft 114 provided on its inner end with a bevel pinion 115 to mesh with the gear wheel 110 and drive the shaft 114. The outer end of the shaft 114 has an axial non-circular socket 116 to receive the correspondingly formed end of a shaft 117 of a pump 118 which is seated on the outwardly extending flange 119 of the bracket plate 112. The pipes 74 and 75 are connected respectively to the outlet and inlet sides of the pump 118 for circulating a fluid medium through the hydraulic system.

Another manner of supporting and operating the fluid circulating pump is illustrated in the modified form shown in Figures 12, 13 and 14. In this form, the pipes or tubes 74 and 75 are carried to the forward end of the tractor and are connected respectively to the outlet and the intake sides of a pump 92 which may be a gear pump, or any other suitable type of pump for creating a forced circulation of the fluid through the circuit. The pump 92 is mounted upon a cross bar 93 which may be fitted between the engine block 94 of the tractor and the radiator and fan and which in the present instance is shown as made up of a pair of sections overlapping at their inner ends and secured together by bolts 95. The ends of the bar 93 are connected to a yoke 96 in the form of an angle bar which is arched downwardly and at its intermediate portion is secured to the pivot pin 97 which connects the front axle 98 of the tractor to the engine casing. In this manner the supporting bar 93 is held firmly in place. The upper portion of the frame work thus formed is anchored by a clamp 99 which is secured about a bushing 100 fitting on the fan shaft 101. The pump 92 is provided with a pulley 102 over which is trained a belt 103 which passes over the fan pulley 104 and which at its lower run passes from the bottom pulley 102 over an idler 105, and thence downwardly and beneath the drive pulley 106 which is carried on the crank shaft 107 of the engine. The belt 103 passes upwardly from beneath the drive pulley 106 to a tension pulley 108 slidably mounted on the supporting bar 93 and normally urged outwardly away from the pump 92 by an adjustable spring 109. The tension pulley 108 maintains the belt 103 taut and holds the latter firmly against the upper side of the fan pulley 104 to turn the latter.

The fan and pump are therefore operated from the same belt. This is of course but one means for driving the pump and any other suitable connections may be made with any parts of the engine for operating the forced pump.

Figure 1 shows the tractor scoop in position for carrying a load, or for carrying the scoop when embodied for distances. When it is desired to bring the scoop into operation for filling it, it is only necessary to exhaust the smaller cylinder 44 so that the cable 57 may be slackened and thus permit the forward end of the pan or scoop 32 to be lowered. As soon as the pan 32 is filled the fluid is admitted to the upper end of the smaller cylinder 44 for elevating the forward end into the position shown in Figure 1. In dumping the scoop the fluid under pressure is admitted to the upper end of the longer cylinder 44 so that its piston is moved downwardly and the cable 48 is drawn so as to lift the rear end of the pan 32. If desired the forward end may be slightly lowered, the controls being dependent upon the operation of the various valves so as to obtain the best possible results according to the particular requirements at the time of dumping. The forward and rear ends of the pan are therefore controlled by hydraulic cylinders 43 and 44 and consequently there is no manual lifting, or any operation of clutches, drums or like mechanism as the lift is direct from the pistons through the cables 48 and 57.

It is obvious that various changes and modifications may be made in the details of construction and design of the above specifically described embodiment of this invention without departing from the spirit thereof, such changes and modifications being restricted only by the scope of the following claims.

What is claimed is:—

1. A scoop attachment for tractors comprising a frame adapted for connection to a tractor, a fluid circuit mounted on the frame including a pair of hydraulic cylinders, means adapted to be connected to the tractor for forcing a circulation of fluid through said circuit, a scoop pan mounted in the frame, and connections between the opposite ends of the pan and said cylinders for controlling the filling and dumping of the pan by the operation of the cylinders.

2. A tractor scoop comprising a frame for attachment to a tractor, hydraulic operating means on the frame, a pan mounted in the frame and suspended from said hydraulic means, manually operable valves connected to the hydraulic means for loading and dumping the pan, and means independent of the hydraulic means for locking the pan in elevated position to relieve the hydraulic means of the weight of the pan.

3. A hydraulic tractor scoop comprising a frame for attachment to a tractor, a pair of hydraulic cylinders mounted in the frame, a scoop pan in the frame connected at opposite ends independently to said cylinders, valves for said cylinders for manipulating the same to raise and lower the opposite ends of the pan, and latching means for locking the pan in elevated position to relieve the cylinders from the weight of the pan and sustain the pan against lowering by leakage in the cylinders when the pan is maintained elevated for a long period of time.

4. A scoop attachment for tractors, having a fluid circuit including fluid operating means, circulation means connected to a tractor for forcing a circulation of fluid through said fluid operating means and said circuit, and a scoop pan, said fluid operating means connected to said pan for controlling the filling and dumping of the pan.

5. A tractor scoop, comprising a frame, means for connecting the frame to a tractor, a pan mounted in the frame, hydraulic means connected to the pan for raising, lowering and dumping the pan, a fluid circulating pump connected to the hydraulic means, a bracket for attachment to the tractor, and a drive shaft carried by the bracket connected to the pump and having a pinion on its inner end for meshing with the transmission mechanism of the tractor.

6. In a scoop attachment for tractors, a horizontal frame, a scoop pan mounted in the frame, a derrick structure carried by the frame and comprising a fore part inclining upwardly and rearwardly over the pan and a rear part rising from the frame to the upper end of the fore part to support it, hydraulic cylinder devices secured along the fore part of the derrick structure, and connections between the cylinder devices and the pan for operating the latter.

7. In a scoop attachment for tractors, a horizontal frame, a scoop pan mounted in the frame, a derrick structure carried by the frame and comprising a fore part inclining upwardly and rearwardly over the pan and a rear part rising from the frame to the upper end of the fore part to support it, hydraulic cylinder devices secured along the opposite sides of said fore part of the derrick structure and operative lengthwise thereof, flexible connectors between the cylinder devices and the pan, and guides carried by the derrick structure for directing the connectors downwardly over the front and rear portions of the pan.

8. In a scoop attachment for tractors, a horizontal frame, a scoop pan in the frame, hydraulic cylinder devices, flexible connectors between said devices and the pan for operating the same, and a support on the frame for said cylinder devices, said support being inclined upwardly from the frame over the pan to permit long strokes of said devices with a low superstructure on the frame, and guides on the support for directing the connectors downwardly to the pan.

9. In a scoop attachment for tractors, a frame, a scoop pan mounted in the frame, hydraulic means connected to the pan for raising and lowering and operating the same, and locking means independent of the hydraulic means for supporting the pan in elevated position to relieve the hydraulic means of the weight of the pan.

In testimony whereof I affix my signature.

SOUTHWICK W. BRIGGS.